July 17, 1956 C. A. ROBINSON 2,754,529

BREAST LINE LASTING MACHINES

Filed Oct. 31, 1952 8 Sheets-Sheet 1

Inventor
Charles A. Robinson
By his Attorney

Inventor
Charles A. Robinson
By his Attorney

July 17, 1956 C. A. ROBINSON 2,754,529

BREAST LINE LASTING MACHINES

Filed Oct. 31, 1952 8 Sheets-Sheet 3

Inventor
Charles A. Robinson
By his Attorney

BREAST LINE LASTING MACHINES

Filed Oct. 31, 1952

8 Sheets-Sheet 4

Inventor
Charles A. Robinson
By his Attorney
[signature]

Inventor
Charles A. Robinson
By his Attorney
[signature]

Inventor
Charles A. Robinson
By his Attorney

Inventor
Charles A. Robinson
By his Attorney
[signature]

July 17, 1956 C. A. ROBINSON 2,754,529

BREAST LINE LASTING MACHINES

Filed Oct. 31, 1952 8 Sheets-Sheet 8

Inventor
Charles A. Robinson
By his Attorney

United States Patent Office 2,754,529

Patented July 17, 1956

2,754,529

BREAST LINE LASTING MACHINES

Charles A. Robinson, Salem, Mass., assignor to United Shoe Machinery Corporation, Flemington, N. J., a corporation of New Jersey Application October 31, 1952, Serial No. 318,052

22 Claims. (Cl. 12—10.2)

This invention relates to shoe machines and is herein illustrated in its application to machines for shaping the breast line portions of shoe uppers over lasts. The invention is herein illustrated as embodied in a machine of the type illustrated in United States Letters Patent No. 1,614,836, granted January 18, 1927, on an application filed in the name of George Goddu, and in United States Letters Patent No. 1,709,347, granted April 16, 1929, on an application filed in the names of Goddu and Mackenzie. For the purposes of the present invention the welt butting instrumentalities which characterize the machines illustrated in the patents above referred to are omitted from the machine as hereinafter described and novel upper shaping instrumentalities are provided.

In the manufacture of shoes generally and particularly shoes having premolded counters, it is the usual practice to shape the upper and lining at opposite sides of the breast line portion of the upper manually by means of hand pincers. This operation is tedious and time consuming and since it is dependent entirely upon the skill and judgment of the shoemaker performing the operation the lasting of the breast line portions of shoes often lacks the uniformity desirable in upper shaping operations.

It is an object of the present invention to provide a machine for shaping the breast line portions of shoe uppers over lasts. In such a machine it is desirable for the operator to have an opportunity to examine the work and make any necessary corrections in the position of the upper on the last before any fastenings are driven to secure the upper in lasted position, and accordingly it is a further object of the invention to provide a machine of the type above described in which the operator may examine the work upon the completion of the upper shaping operations and may return the operating instrumentalities to their starting position to permit such correction of the position of the upper relatively to the operating instrumentalities as may be required.

With these and other objects in view as will hereinafter appear the present invention in one aspect thereof consists in the provision in a machine for shaping uppers over lasts, of gripper jaws for tensioning a side portion of an upper relatively to a last by lengthwise movement of the last, and an actuator, herein illustrated as a treadle, for closing the gripper jaws and moving the last to effect the tensioning of the upper, the treadle being sufficiently under the control of the operator to permit the opening of the gripper jaws and the return of the last to its starting position at any stage in the tensioning operation in order to permit adjustment of the position of the upper relatively to the gripper jaws. A detent is provided for holding the jaws open, the detent being released by an initial movement of the actuator thus to permit the jaws to close just prior to the tensioning of the upper. The invention contemplates the provision of power operated means for fastening the upper to an insole on the last bottom after the completion of the tensioning operation. In the illustrated organization the upper tensioning means is constructed and arranged to operate simultaneously at opposite side portions of the upper.

In the tensioning operation the last and upper are advanced from a first stop position which, in the illustrated organization, is provided by a yieldingly mounted first abutment member, to a second stop position, provided, as herein illustrated, by a positively mounted second abutment member. In the illustrated construction the first abutment member is mounted on a carrier which in turn is mounted in the second abutment member for movement in the direction of the length of the last. In the illustrated organization the first abutment member is mounted on the carrier for adjustive movement widthwise of the last. To provide for adjustment of the abutment members in the direction of the length of the last in accordance with the size of the upper to be operated upon, the entire abutment assembly is mounted for movement as a unit in the direction of the length of the last.

In the upper tensioning operation the actuator causes the grippers to engage the lasting margin of the upper and then causes endwise movement of the last relatively to the grippers from the first stop position to the second stop position. In order to provide for the positioning of the last heightwise thereof relatively to the operating instrumentalities of the machine, the second abutment member carries a third abutment member constructed and arranged to engage an insole on the last bottom. In order to provide for the tensioning of the upper heightwise thereof during its lengthwise tensioning the illustrated gripping means is so constructed and arranged that the endwise movement of the last from its first stop position to its second stop position, after the gripping means has engaged the lasting margin of the upper, causes the gripping means to move heightwise of the last away from the last bottom.

In the illustrated organization the last and the upper thereon are advanced with their supporting jack post from a retracted position by manual movement applied directly to the last or the jack post and such movement of the jack post causes a pawl and a ratchet to be brought into operative relation to each other in order to provide for the connection of two elements of a linkage for further advancing the jack post. In the illustrated organization one element of the linkage is connected to the treadle and the other to the supporting member.

For wiping the lasting margin of the upper inwardly over an insole on the last bottom, the illustrated machine is provided with a wiper which is actuated by means operated by a movement of the slide for the tack driver to advance the tack driver from a retracted position to an advanced position.

These and other features of the invention will now be described with reference to the accompanying drawings and pointed out in the appended claims.

Figure 1:
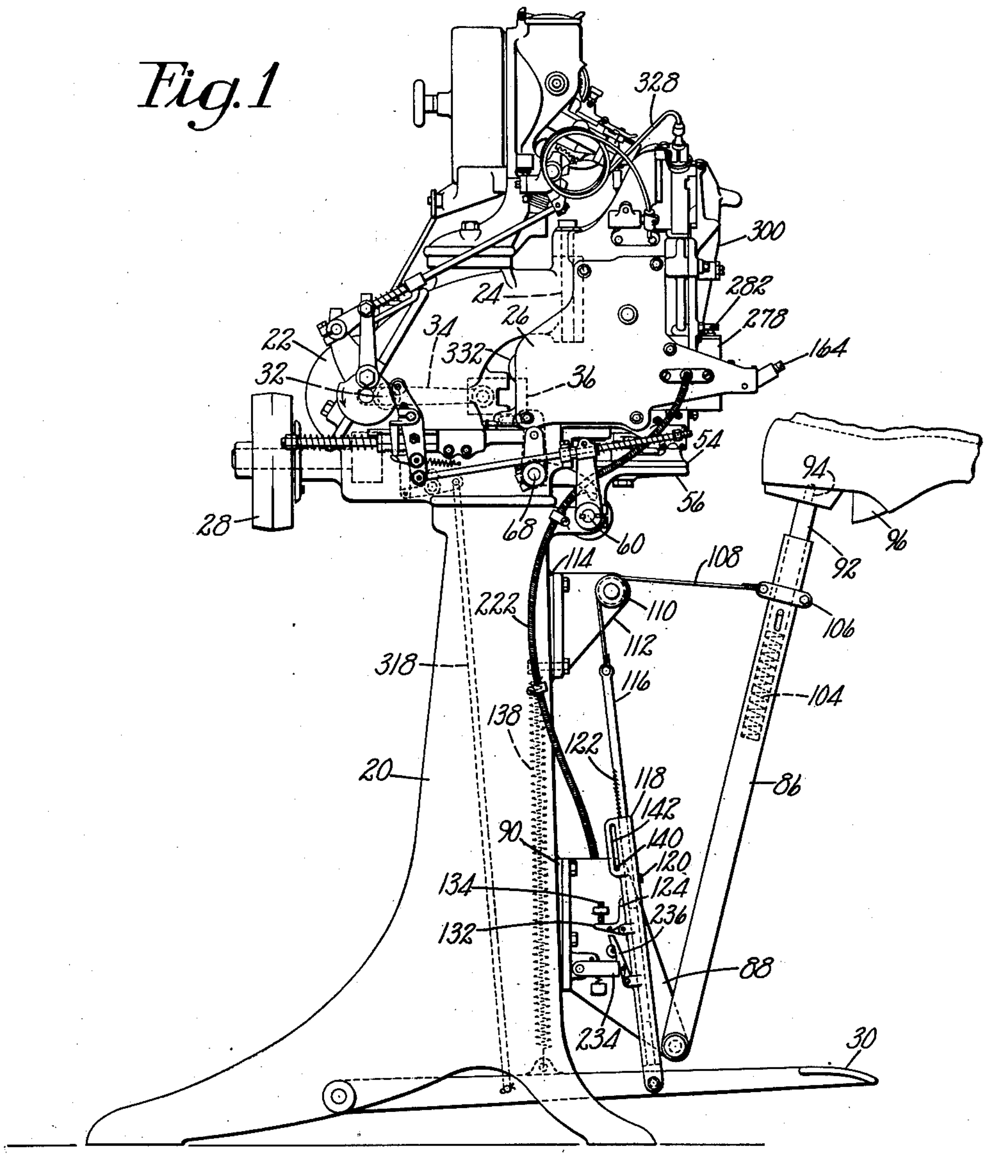
Fig. 1 is a left side elevation of a machine in which the present invention is embodied.

The invention is herein illustrated as incorporated in a machine of the type illustrated, for example, in the patent to Goddu hereinbefore referred to. Machines of this type comprise a hollow standard 20 on which is fixed a head in the form of a hollow gooseneck 22 having in its forward portion bearings for two vertical pins 24 arranged at opposite sides of the center of the machine widthwise thereof on which are pivotally mounted for swinging movement toward and from each other widthwise of the machine two side frames 26 which carry the operating instrumentalities of the machine. The machine illustrated in the Goddu patent is actuated by power transmitted by a continuously driven pulley 28 through a one-revolution clutch mechanism which is operated by the depression of a treadle 30.

Figure 2:
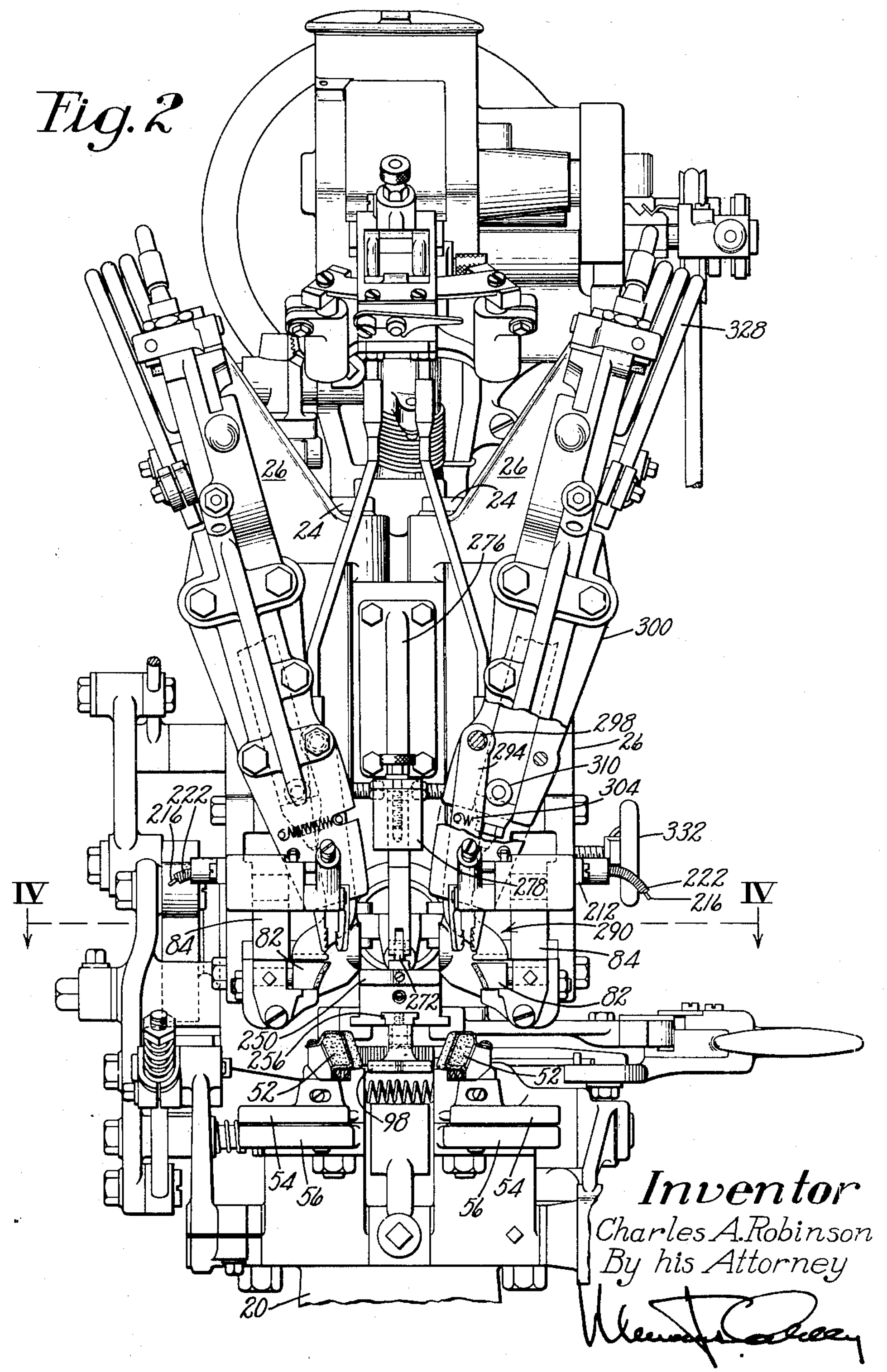
Fig. 2 is a front elevation of the head of the machine.
Figure 3:
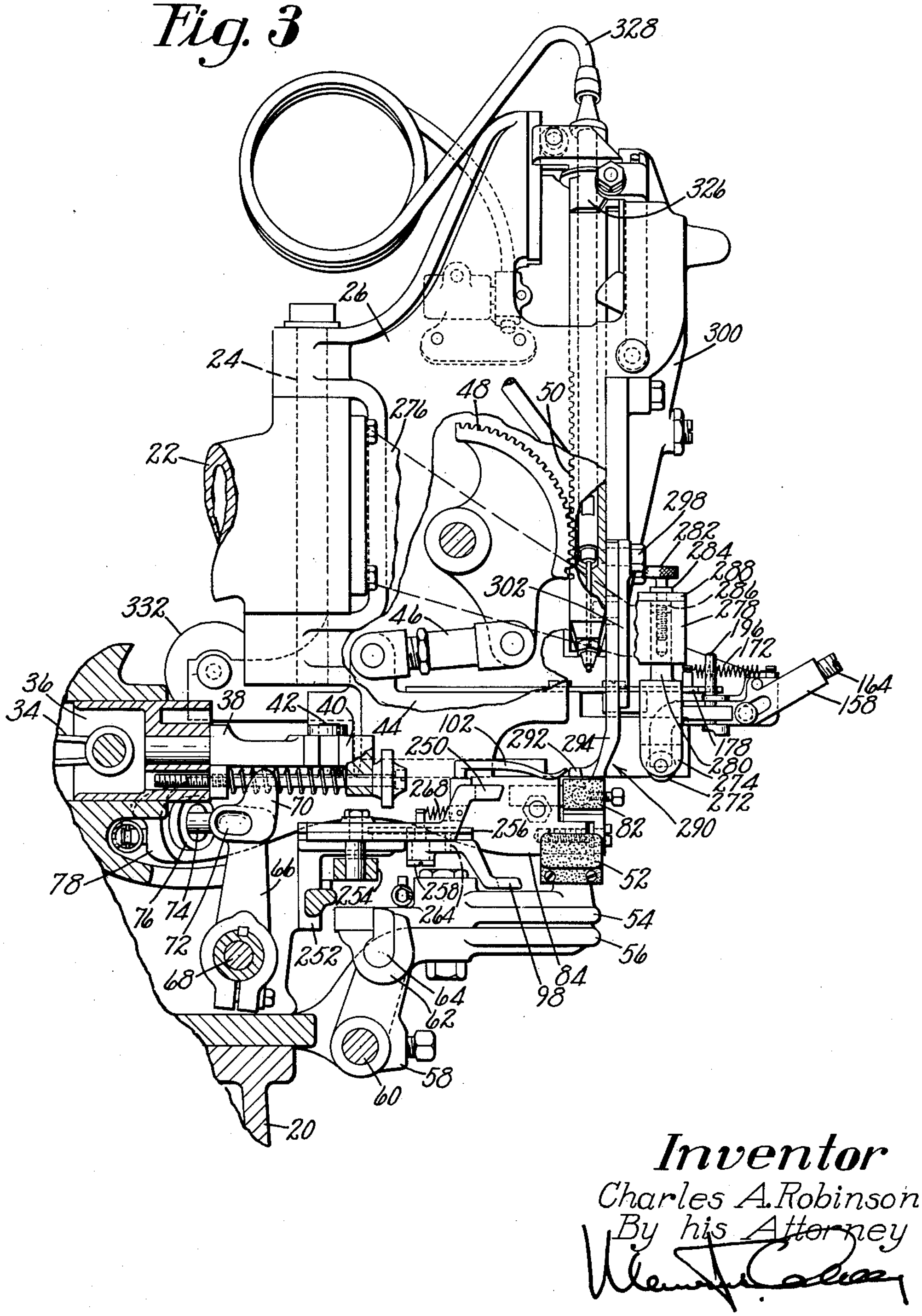
Fig. 3 is a view looking to the right from the center of the machine and illustrating a portion of the machine head in section.
Figure 4:
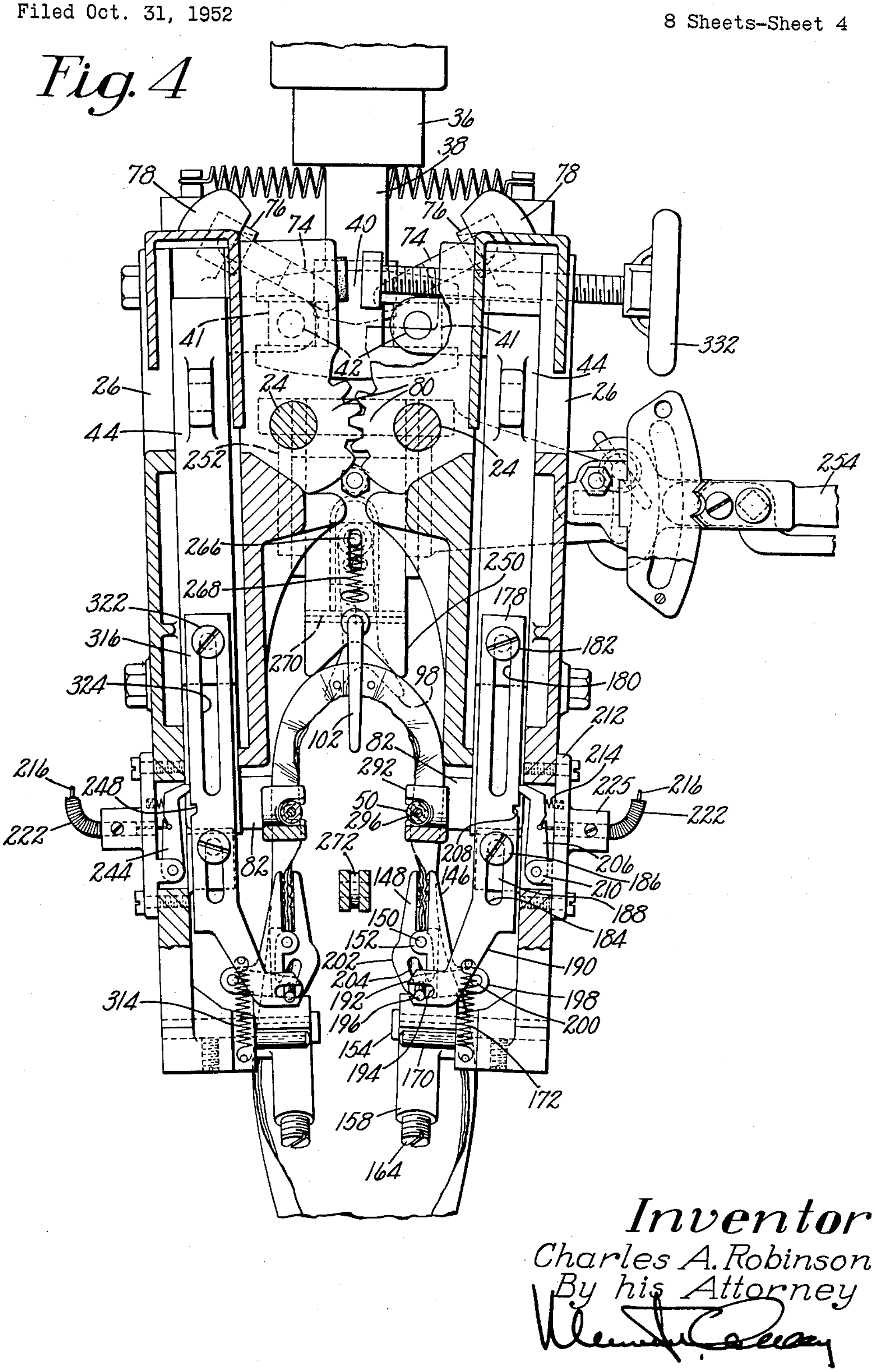
Fig. 4 is a section taken substantially on a plane indicated by the line IV—IV of Fig. 2, the machine being in a different stage in its operating cycle from that shown in Fig. 2.

In common with the machine of the Goddu patent the machine herein illustrated is provided with means for driving two tacks at opposite sides of the shoe in the region of the heel breast line to secure the lasted margins of the upper and lining to an insole on the last bottom and with work supporting pads constructed and arranged to engage the top marginal portion of the upper at opposite sides of the heel end of the last, this being the narrow portion of the last adjacent to its plane cone face. Also, in common with the Goddu machine the machine herein illustrated is provided with power operated means for swinging the side frames toward each other and with presser members carried by the side frames and arranged to engage opposite side portions of the upper adjacent to its lasting margin, the engagement of the presser members with the upper terminating the swinging movement of the side frames toward each other and determining the operative position of the tacking mechanism widthwise of the shoe. Referring to Fig. 3, the tacking mechanism is mounted in the side frames 26 and is elevated above its operating position as shown in Fig. 3 when the machine is at rest. The tacking mechanism is moved downwardly and actuated by the power operation of a crank 32 (Fig. 1) connected by a rod 34 to a cylindrical slide 36. Mounted in and extending forwardly from the slide 36 is an arm 38 (Fig. 4) which terminates at its forward extremity in an H-shaped head 40. Slidably mounted in each side of the head is a block 41 swiveled on a pin 42 mounted in the rear portion of a slide 44 mounted for horizontal movement in the side frame 26. The slide 44 is connected by a link 46 (Fig. 3) to a downward extension of a segment 48 carried by the side frame and arranged to mesh with rack teeth formed in a tack driver bar carrier or slide 50. The work supporting pads are identified by the numeral 52 (Fig. 2) and are carried at the forward ends of levers 54 (Fig. 3) pivotally mounted on a plate 56 fixed to the machine frame. The pads are moved inwardly by the power operation of an arm 58 fixed to a shaft 60 and carrying in a head 62 at its upper end a wedge member 64 which engages inwardly extending rear end portions of the levers 54. The wedge member 64 is slidably mounted in the head 62 for movement widthwise of the machine so as to insure the engagement of both of the pads 52 with the shoe and the application of uniform pressure thereto. For swinging the side frames toward each other an arm 66 is fixed to a power operated shaft 68. At the upper end of the arm is a head 70 having sockets 72 in opposite sides thereof for mounting two thrust bars 74. Referring to Fig. 4, the outer ends of the thrust bars are seated in sockets in members 76 mounted in rearward extensions 78 of the side frames 26. Rearward movement of the head 70 causes a toggle-like action of the thrust bars which swings the side frames toward each other, and intermeshing segments 80 formed in the hub portions of the side frames cause equal and opposite movement of the side frames toward and from a shoe in the machine. Referring to Fig. 2, the side presser members are identified by the numeral 82, said members being adjustably mounted in downwardly extending portions 84 of the side frames 26. For a further description of the swinging frames the tacking mechanism and the shoe engaging members above referred to reference may be had to the Goddu patent hereinbefore identified.

Figure 9:
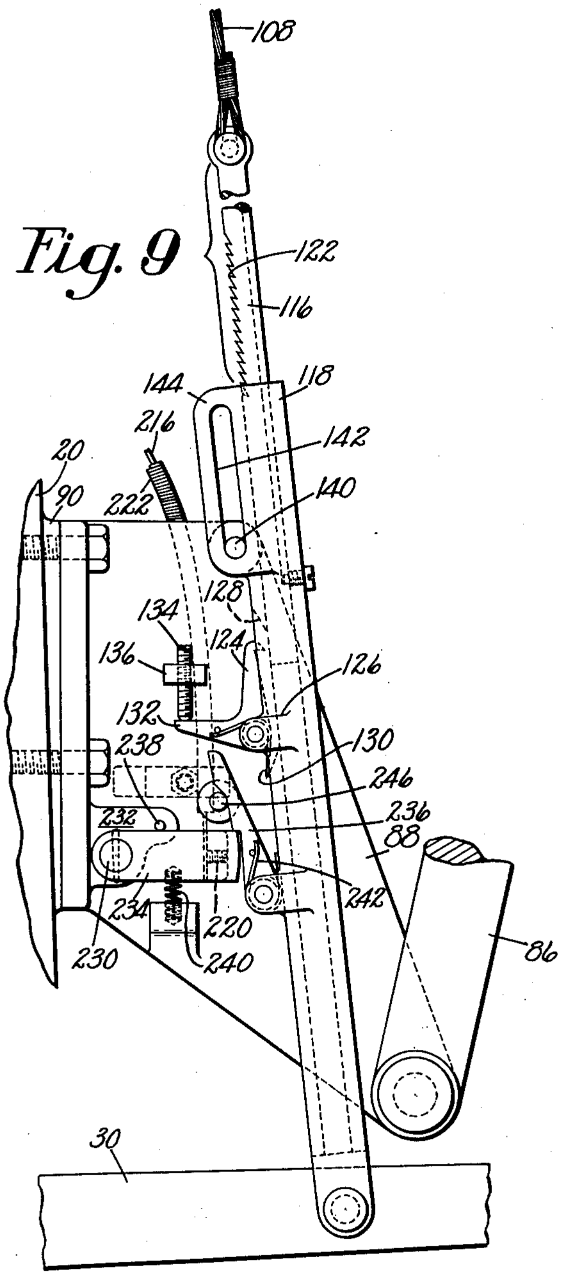
Fig. 9 is an enlarged view in left side elevation illustrating certain treadle operated mechanism.
Figures 12, 13:
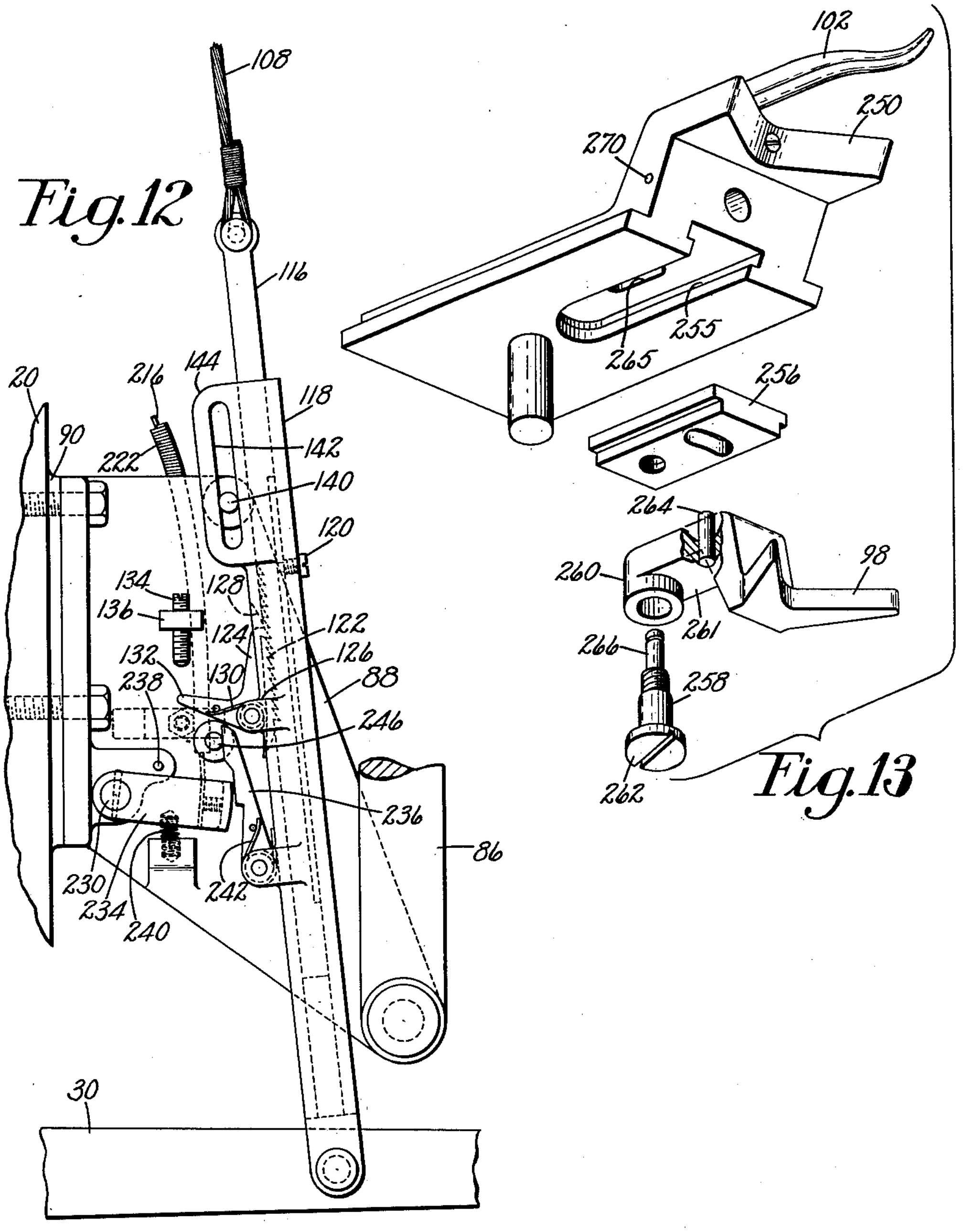
Fig. 12 is a left side elevation similar to Fig. 9 showing the treadle operated mechanism at a stage in the operation of the machine different from that shown in Fig. 9.
Fig. 13 is an exploded perspective view illustrating the abutment members.

For supporting a last and an upper thereon arranged in inverted position, the illustrated machine is provided with a jack post 86 (Fig. 1) pivotally mounted at its lower end on a bracket 88 secured to the vertical plane face of a land 90 projecting from the base portion of the standard 20. Slidably mounted in the tubular upper end portion fo the jack post is a heel post 92 having at its upper end a last pin 94 which fits freely into the thimble in the heel portion of a last, such, for example, as the last 96 illustrated in Fig. 1. The jack post 86 is swung rearwardly toward the standard 20 by a manual heelward movement of the last which is terminated by the engagement of the heel end portion of the upper on the last with an abutment member 98 (Fig. 7) having a forked end portion constructed and arranged to engage the top marginal portion of the upper. The last and upper are positioned heightwise thereof in the machine by the engagement of the heel end portion of an insole 100 on the last bottom with an abutment member or finger 102. As shown in Fig. 1 the heel post 92 is supported on a spring 104 mounted in the tubular portion of the jack post thus permitting the last to move downwardly when the insole 100 comes into contact with the upturned forward end portion of the finger 102. Fixed to the upper portion of the jack post 86 is a collar 106 to which is anchored one end of a cable 108. The cable extends rearwardly from the collar and over a pulley 110 mounted on a bracket 112 projecting forwardly from a land 114 in the upper portion of the standard 20. The cable 108 carries a cylindrical member 116 (Fig. 9) which is slidably mounted in a tubular member 118 pivotally mounted at its lower end on the treadle 30. Referring to Fig. 12, the cylindrical member 116 is grooved longitudinally to receive the reduced end portion of a screw 120 mounted in the tubular member 118. The screw 120 serves to prevent rotation of the member 116 in the tubular member 118 and also serves to limit the upward movement of the member 116 thus determining the forwardly inclined or rest position of the jack post 86 as shown in Fig. 1. During the rearward movement of the jack post the cylindrical member 116 slides downwardly into the tube 118, bringing one of a series of ratchet teeth 122 formed in the rear portion of the member 116 into registration with a pawl 124 (Fig. 9) pivotally mounted between ears 126 projecting rearwardly from the tubular member 118, the tubular member being provided with a longitudinal slot 128 adjacent to the pawl to permit the pawl to be moved forwardly by a torsion spring 130 into ratchet engaging position. When the treadle is at the limit of its upward movement, as shown in Fig. 9, the pawl is held retracted by the engagement of a tail 132 projecting rearwardly from the pawl with an abutment screw 134 mounted in an ear 136 projecting laterally from the bracket 88. The pawl is normally held retracted by the action of a spring 138 (Fig. 1) which holds the treadle 30 at the limit of its upward movement. In the illustrated organization the upward movement of the treadle is limited by a pin 140 projecting laterally from the upper portion of the bracket 88 through a slot 142 extending longitudinally of a boss 144 projecting rearwardly from the tubular member 118. During the downward movement of the treadle 30 the spring 130 advances the pawl 124 into ratchet-engaging position and continued downward movement of the treadle thereafter moves the cylindrical member 116 downwardly, thus imparting an additional increment of rearward movement to the jack post 86 for a purpose hereinafter described.

Figures 5, 6, 14:
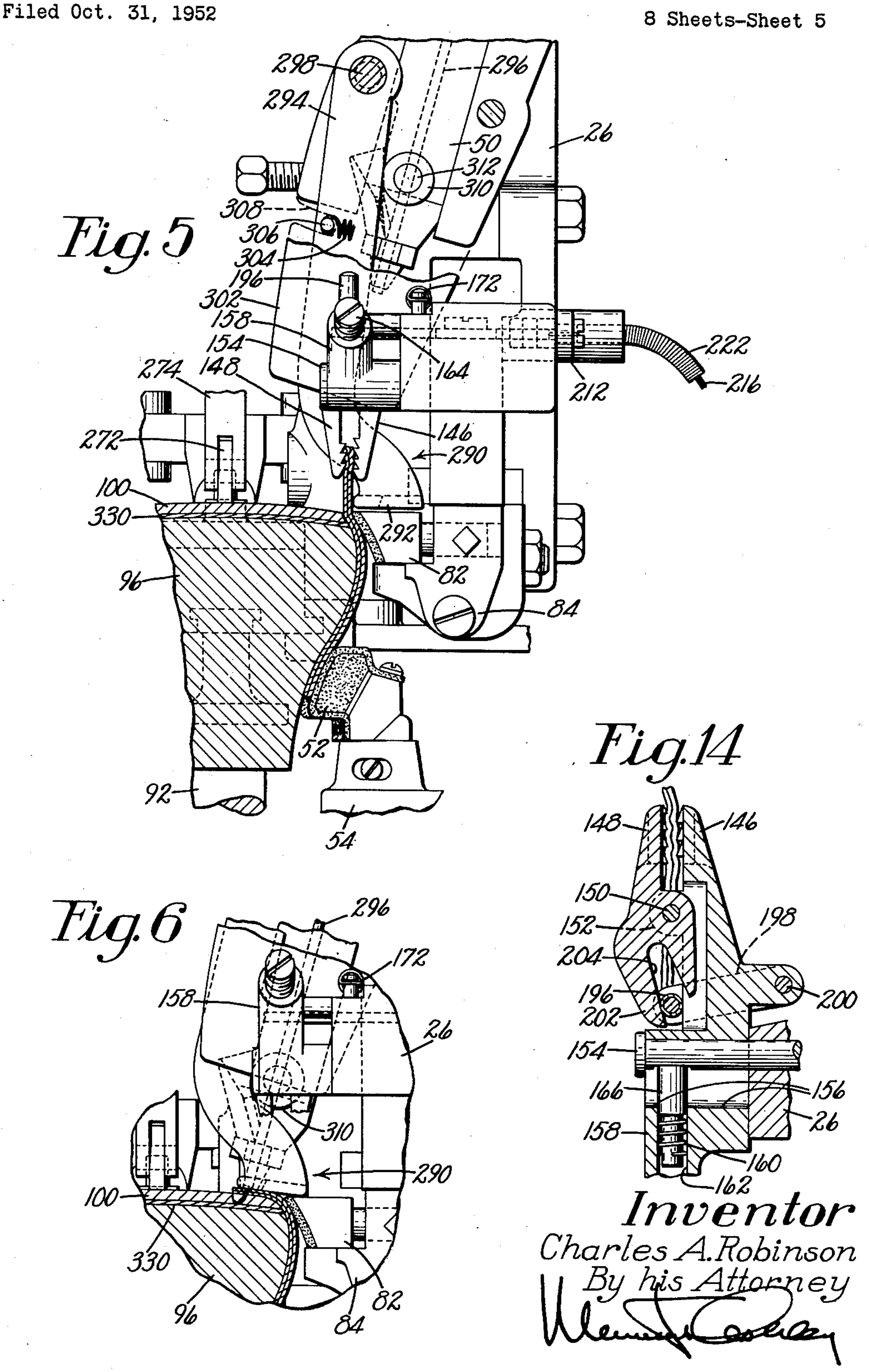
Fig. 5 is an enlarged view in front elevation illustrating the breast line gripper mechanism at the right side of the machine and showing a shoe in cross section.
Fig. 6 is a detail view similar to Fig. 5 illustrating the breast line wiper mechanism at the end of the wiping operation.
Fig. 14 is a section on the line XIV—XIV of Fig. 7.
Figures 7, 8:
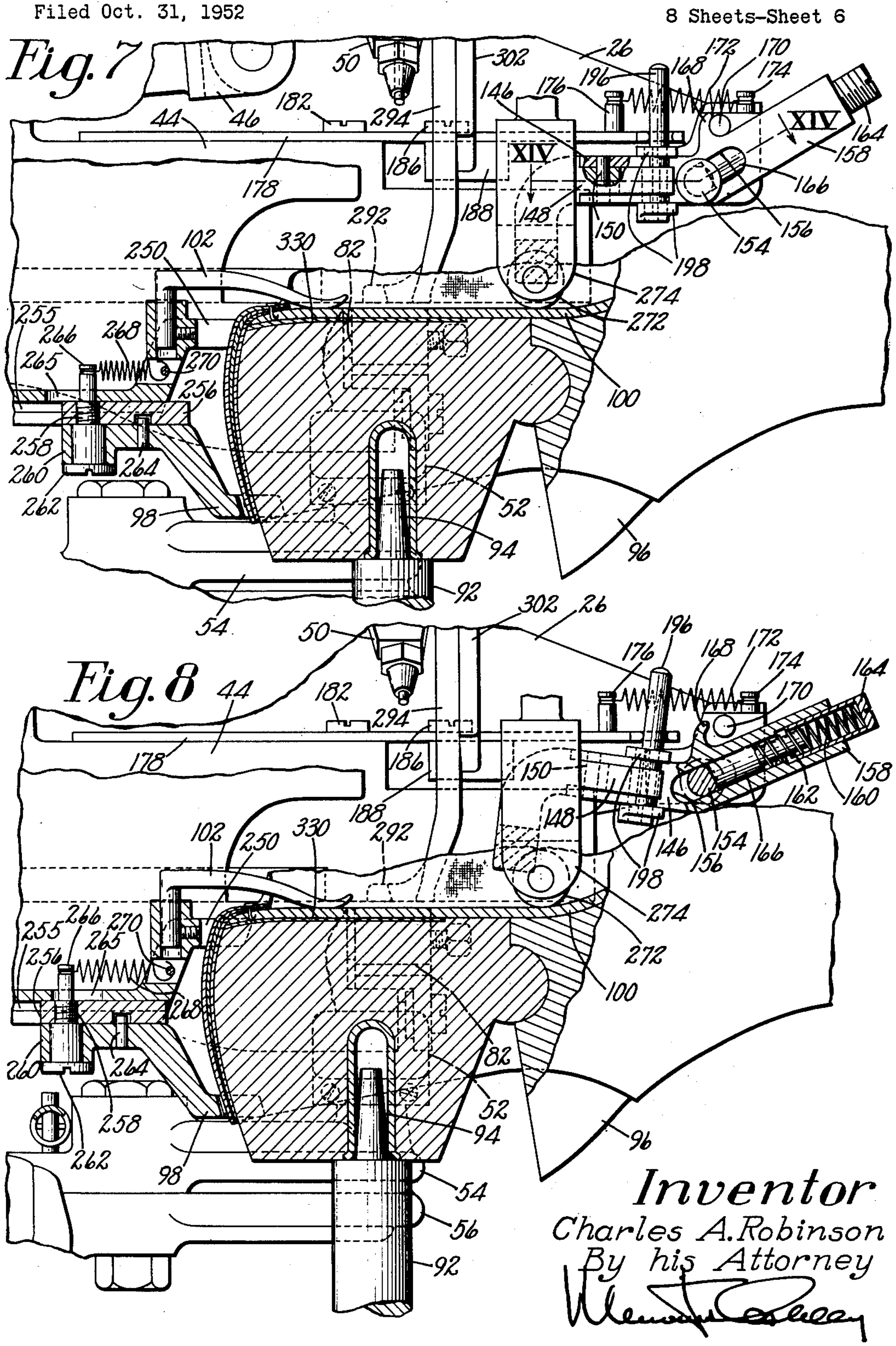
Fig. 7 is an enlarged view in left side elevation illustrating the breast line gripper mechanism, the abutment members, and associated parts.
Fig. 8 is a left side elevation similar to Fig. 7 showing the breast line gripper mechanism at a stage in the operation of the machine different from that shown in Fig. 7.
Figure 11:
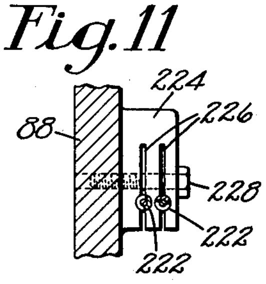
Fig. 11 is a section on the line XI—XI of Fig. 10.
Figure 10:
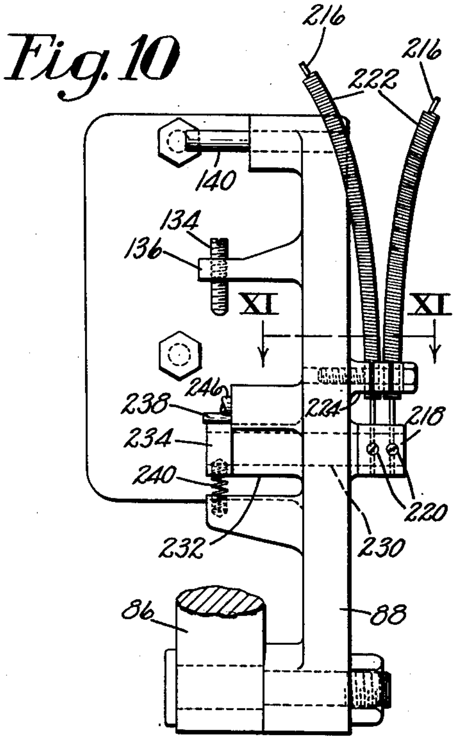
Fig. 10 is a front elevation illustrating certain parts shown in Fig. 9.

For tensioning the heel end portion of the upper heightwise and toewardly, the illustrated machine is provided with two grippers constructed and arranged to engage the lasting margins of the upper and/or the lining at opposite sides of the shank portion of the shoe at points substantially adjacent to the heel breast line. Referring to Figs. 4 and 14, the gripper at the right side of the shoe comprises an outer jaw 146 and an inner jaw 148 pivotally mounted for closing and opening movements on a pin 150 carried by two lugs 152 projecting laterally from the outer jaw 146. As shown in Figs. 7 and 8, each gripper jaw is an angular member having a downwardly extending portion in which the gripping teeth are formed. The outer jaw 146 is extended forwardly to provide for the mounting of the gripper assembly on a headed pin 154 carried by the swinging frame 26. The pin 154 projects laterally and inwardly from the swinging frame 26 and mounts the gripper assembly for swinging movement in a vertical plane. The pin 154 extends through a slot 156 formed in the upturned forward end portion 158 of the outer jaw 146. The gripper assembly is normally held in its position relatively to the pin 154, shown in Fig. 7, by the action of a spring 160 (Fig. 8), the lower portion of which is mounted in a longitudinal bore 162 in the end portion 158 and the upper end portion of which is mounted in a thimble 164 which is externally threaded and mounted in a tapped counterbore in the end portion 158. The spring 160 acts against a plunger 166 slidably mounted in the bore 162 and arranged to bear against the pin 154. When the machine is at rest the plunger holds the gripper assembly at the limit of its forward movement, this position being determined by the engagement of the pin 154 with the arcuate surface at the rear end of the slot 156. The angular position of the gripper assembly when the machine is at rest is determined by the engagement of an arcuate finger 168 projecting upwardly from the outer jaw 146 with a pin 170 projecting laterally inwardly from the swinging frame 26. For closing the gripper jaws on the work a spring 172 is mounted at its forward end on a pin 174 carried by the swinging frame 26 and at its rear end on a pin 176 projecting upwardly from the forward end portion of a plate 178 mounted for sliding movement generally lengthwise of the last 96 on the upper surface of the forward portion of the slide 44. Referring to Fig. 4, the rear portion of the plate 178 has formed therein a relatively long longitudinal slot 180 through which extends a headed screw 182 projecting upwardly from the slide 44. As shown in Fig. 7, the head of the screw 182 is arranged in contiguous relation to the upper surface of the plate 178 and holds the plate against movement away from the slide 44. Formed in the forward portion of the plate 178 (Fig. 4) is a relatively short longitudinal slot 184 through which extends a headed pin 186 mounted in and projecting upwardly from a boss 188 projecting inwardly from the swinging frame 26. At its forward end the plate 178 has an arm 190 which extends forwardly and inwardly toward the gripper assembly and has at its forward end an inturned ear 192 having an open ended slot 194. Projecting upwardly through the slot 194 is a pin 196 which is operated by sliding movement of the plate 178 to close the gripper jaws. Referring to Fig. 7 the pin is mounted in two arms 198 positioned respectively above and below the gripper assembly. Referring to Fig. 4 the arms 198 are fixed to a pin 200 which is mounted to rotate in a lug projecting laterally and outwardly from the outer jaw 146. That portion of the pin 196 between the two arms 198 extends through an angular slot 204 formed in a forward extension 202 of the inner jaw 148. During the forward movement of the plate 178 by the action of the spring 172 the pin 196 acts against the inner wall of the slot 204, swinging the inner jaw 148 in a clockwise direction about the pin 150 to cause the jaws to grip the work. The closing of the jaws occurs when a pawl 206 is withdrawn from a notch 208 formed in the plate 178. The pawl 206 is positioned in a recess formed in the swinging frame 26 and is pivotally mounted between two ears 210 projecting inwardly from a plate 212 secured to the swinging frame 26 and bridging the recess formed therein. A spring 214 mounted in a socket in the plate 212 and arranged to engage the pawl 206 urges the pawl toward the plate 178. The pawl 206 is withdrawn from the notch 208 during the first stage of the downward movement of the treadle 30 by mechanism now to be described. Referring to Figs. 9 and 10, two Bowden wires 216 are mounted in suitable bores in an arm 218 and are secured therein by clamping screws 220. As shown in Fig. 10 each of the Bowden wires is slidably mounted in a flexible tube 222 the lower end of which is secured to a boss 224 and the upper end in a boss 255 (Fig. 4) projecting from the plate 212. As shown in Fig. 11, the boss 224 has formed therein two vertical bores to receive the two flexible tubes and two notches 226 are cut diametrically through the bores and a clamping screw 228 is mounted in a bore extending through the boss at right angles to the notches and is tightened against the front face of the boss to clamp the flexible tubes against movement therein. The arm 218 is fixed to a shaft 230 extending through the bracket 88 and a boss 232 projecting to the left from the bracket. Fixed to the left end portion of the shaft 230 is an arm 234 the free end of which is arranged to register with an arm 236 carried by the tube 118, the arm 236 being notched for engagement with the free end portion of the arm 234. When the machine is at rest the treadle operated mechanism is arranged as shown in Fig. 9 with the arm 234 held against a stop pin 238 in the bracket 88 by a spring 240 and the arm 236 is held in contact with the free end of the arm 234 by a torsion spring 242. During the first stage of the downward movement of the treadle 30 the arm 236 swings the arm 234 downwardly thus imparting clockwise movement to the shaft 230 and to the arm 218 which carries the Bowden wires. Thus the Bowden wires are moved downwardly and their upper ends which are attached to the pawl 206 (Fig. 4) and the corresponding pawl 244 at the opposite side of the machine are moved outwardly to withdraw the pawls from the notches in order to permit the gripper jaws to be closed. Further downward movement of the treadle after the gripper jaws are closed brings the offset upper end portion of the arm 236 into engagement with a pin 246 projecting from the bracket 88 thus disengaging the arm 236 from the arm 234 and leaving the arm 234 under the control of the spring 240. The arm 234 will be returned to its normal rest position by the spring 240 when the pawls 206 and 244 re-enter the notches 208 and 248 during the operation of the machine as hereinafter described.

In the operation of the illustrated machine the heel end portion of the upper is tensioned over the last by a heelward movement of the last from its first stop position illustrated in Fig. 7 to its second and final stop position illustrated in Fig. 8. In the illustrated organization such heelward movement of the last is effected by a further depression of the treadle 30 after the gripper jaws have closed on the lasting margin of the upper. To this end the pawl 124 is arranged to engage one of the ratchet teeth in the member 116 after the treadle 30 is moved downwardly to an extent sufficient to permit the spring 130 to advance the pawl 124 into ratchet engaging position. The engagement of the pawl with the ratchet member provides a direct connection from the treadle to the cable 108 and further downward movement of the treadle thereafter causes the cable to swing the jack post 86 rearwardly to advance the last into its position shown in Fig. 8. The first stop position of the last is determined by the engagement of the upper on the last with the forked end portion of the lower abutment member 98 and its second and final stop position is determined by the engagement of the upper on the last with the forked end portion of the upper abutment member 250. The downwardly offset shank portion of the upper abutment member 250 is constructed and arranged for sliding movement toward and from the heel end of a last in the machine in an open ended T slot formed in a bracket 252 (Fig. 4) fixed to the base portion of the gooseneck 22. The abutment member 250 is moved through the guideway in the bracket by the operation of a hand lever 254 to adjust the abutment member in accordance with the size of the shoe to be operated upon. After so adjusting the abutment member the hand lever is locked in position in order to hold the abutment member stationary during the operation of the machine. The construction and operation of the hand lever 254 is described in the Goddu et al. Patent No. 1,709,347 hereinbefore referred to, to which patent reference may be had for a further description of the adjusting mechanism. To provide for the mounting of the lower abutment member 98 the forward part of the shank portion of the upper abutment member has formed therein an open ended T slot 255 (Fig. 13) extending longitudinally of the shank portion. Mounted in said slot is a slide 256 in which is mounted a headed screw 258. The lower abutment member 98 has a hub 260 at the rear end of a shank position 261, said hub being freely mounted on the head of the screw 258 and resting on a flange 262 at the lower extremity of the head. To permit the forked end of the abutment member 98 to adjust itself to the heel end of the last widthwise thereof, the abutment member is free to swing on the head of the screw 258 within limits determined by the length of an arcuate slot formed in the slide 256 and arranged to register with a pin 264 mounted in and projecting upwardly from the shank portion 261 of the abutment member. The slide 256 is movable toward and from the heel end of the shoe in the machine within limits determined by the length of a slot 265 extending longitudinally of the shank portion of the upper abutment member 250 through which slot extends a stem 266 formed in and projecting upwardly from the screw 258. The abutment member 98 is normally held at the limit of its forward movement as shown in Fig. 7 by a spring 268, the rear portion of which is anchored to the stem 266 and the forward portion of which is anchored to a pin 270 extending diametrically through a horizontal bore in the inclined portion of the abutment member 250.

Referring to Fig. 3 the upward thrust exerted against the last by the operation of the grippers is taken by a roll 272 mounted in a vertical yoke 274 and arranged to engage the insole on the last bottom substantially between the portions of the lasting margin of the upper engaged by the grippers. For mounting the yoke 274 a bracket 276 is secured to a vertical plane surface at the forward extremity of the gooseneck 22 and extends forwardly with a downward inclination therefrom terminating in a head 278. The head has formed therein a vertical guideway which is square in cross section and has mounted therein the square shank portion 280 projecting upwardly from the yoke 274. For adjusting the roll heightwise of the shoe a knurled headed screw 282 is mounted in a threaded bore in the upper portion of the shank 280, the screw being held against endwise movement relatively to the head 278 by the engagement of flanges 284 and 286 formed in the head of the screw with a plate 288 fixed to the top of the head. Thus the screw 282 may be turned to adjust the roll 272 in accordance with the inclination of the shank portion of the last bottom.

For wiping the lasting margins of the upper and the lining at opposite sides of the breastline portion of the shoe inwardly over the insole on the last bottom the illustrated machine is provided with a pair of wiper members or arms one of which is illustrated in Fig. 3 and identified by the numeral 290. The wipers are substantially alike in their construction and operation and the following description of the construction and operation of the wiper 290 will apply equally well to the companion wiper at the left side of the machine. The wiper 290 is herein illustrated as a foot 292 projecting laterally and heelwardly of the shoe in the machine from the lower end of an arm 294 and is notched as shown in Fig. 4 to provide clearance for the operation of the tack driver slide 50 and a tack driving pin 296. The arm 294 is pivotally mounted on a headed screw 298 extending through its upper end portion and mounted in the lower portion of a cover plate 300 fixed to the forward portion of the swinging frame 26. The arm 294 is held against movement lengthwise of the shoe between the tack driver slide 50 and a downward extension 302 of the cover plate 300 but is free to swing on the screw 298 from its retracted position shown in Fig. 5 to its advanced position shown in Fig. 6. The wiper is normally held in its retracted position shown in Fig. 5 by a spring 304 the left end of which is anchored to a pin 306 projecting forwardly from the arm 294 and the right end of which is anchored to a pin (not shown) projecting rearwardly from the cover plate 300. The retracted position of the wiper is determined by the engagement of the pin 306 at the base of an open ended slot 308 formed in the cover plate 300. For actuating the wiper 290 to wipe the lasting margins of the upper and the lining inwardly over the margin of the insole 100 a roll 310 is pivotally mounted on a pin 312 projecting forwardly from the lower end portion of the tack driver slide 50 and arranged to engage the outer edge face of the arm 294. In order to provide for the operation of the wiper by the roll 310, the arm 294, for the greater part of its length, is offset laterally to the left as seen in Fig. 5 from the wiper foot 292.

In the following description of the operation of the illustrated machine the last and the upper thereon are frequently referred to as "the shoe" for convenience of description.

In the operation of the illustrated machine a last having mounted thereon a shoe upper, which has preferably been pulled over and tacked to the toe portion of the insole, is arranged in inverted position and mounted on the last pin 94 as shown in Fig. 1. The operator then grips the forepart of the shoe with one hand and moves the shoe away from him, thus advancing the shoe and the work support into their respective positions shown in Fig. 7. During the rearward movement of the shoe the operator uses his free hand to guide the lasting margins as required, to cause them to be positioned between the jaws of the grippers. Prior to the operation of the machine the grippers will have been adjusted toward or from each other, as required, in accordance with the size of the shoe to be operated upon, by adjusting the relative angular position of the swinging frames 26. In the illustrated organization the swinging frames are adjusted by turning a hand screw 332 (Figs. 1 and 4) which is mounted in a threaded bore in the swinging frame at the right side of the machine and bears against an abutment surface in the opposite swinging frame. The rearward movement of the shoe from its position in Fig. 1 into position to be operated upon by the power-operated instrumentalities of the machine is interrupted by the engagement of the top margin at the heel end of the upper with the forked end of the lower abutment member 98. The spring 268 offers sufficient resistance to the rearward movement of the abutment member 98 to cause the abutment member to arrest the heelward movement of the shoe and to prevent inadvertent movement of the shoe beyond that point by the hand of the operator. As the shoe advances into the machine it is positioned heightwise thereof relatively to the operating instrumentalities of the machine, first, by the engagement of the bottom margin of the upper and the insole at the heel end of the shoe with the roll 272, and finally, by their engagement with the finger 102. The shoe may be tilted as required to cause its heel end to be moved downwardly into position to engage the roll 272. After the shoe has been brought into its initial rest position, shown in Fig. 7, with the lasting margins of the upper and the lining positioned between the jaws of the grippers, the operator depresses the treadle 30 sufficiently to operate the Bowden wires 216 to retract the pawls 206 and 244 (Fig. 4) in order to permit the spring 172 and the corresponding spring 314 at the left side of the machine to advance the plate 178 and the plate 316 at the left side of the machine toewardly to close the gripper jaws on the lasting margins. Further depression of the treadle thereafter causes the pawl 124 (Fig. 9) to engage one of the ratchet teeth 122, thus connecting the treadle to the cable 108 so that continued depression of the treadle forces he shoe heelwardly against the tension of the spring 268 (Figs. 7 and 8) into its position shown in Fig. 8, which position is determined by the engagement of the heel portion of the upper with the abutment member 250. During the movement of the shoe from its position in Fig. 7 to its position shown in Fig. 8 the heel portion of the upper is tensioned toewardly by the grippers. The resistance of the upper to the tensioning action causes the grippers to swing in a clockwise direction, as seen in Fig. 8, about the pin 154, thus imparting to the upper and the lining a heightwise tensioning action sufficient to eliminate any wrinkles that may have occurred therein. It will be understood that the spring 160 (Fig. 8) prevents excessive strain on the upper materials by the operation of the treadle, as above described.

If, after the completion of the tensioning of the upper by the operation of the treadle, it appears to the operator that the heel portion of the upper is not correctly positioned on the last, the operator may correct the position of the upper after first permitting the treadle to return to its rest position and manually opening the gripper jaws to permit the required adjustment of the lasting margin relatively thereto. In order to facilitate the manual opening of the gripper jaws the pin 196 (Figs. 3 and 5) which operates the gripper jaws, is extended upwardly so that it may conveniently be engaged by the thumb and forefinger of the operator and moved rearwardly to cause the jaws to open. The operator will, of course, move the pin rearwardly far enough to permit the pawls 206 and 244 to enter the notches 208 and 248 and hold the slides against forward movement thus holding the gripper jaws in their open position. After adjusting the position of the lasting margins of the upper materials relatively to the gripper jaws the operator again depresses the treadle to cause the upper to be tensioned toewardly and heightwise of the last as hereinbefore described. During the latter part of the depression of the treadle and just before the rearward movement of the shoe is finally and positively arrested by the engagement of the heel end portion of the upper with the abutment member 250 the treadle imparts downward movement to a link 318 to operate a one-revolution clutch mechanism which initiates the power operation of the machine. During the first stage of the power cycle of the machine the heel pads 52 (Fig. 2) are brought into gripping engagement with the top margin of the upper at opposite sides of its heel portion by the operation of the arm 58 (Fig. 3) and the side frames 26 are swung inwardly by the operation of the arm 66 to bring the presser members 82 (Fig. 2) into gripping engagement with the opposite sides of the heel portion of the upper at areas adjacent to the lasting margin. After the upper has been clamped against the last by the pads 52 and the presser members 82 the segment 48 (Fig. 3) and the corresponding segment in the side frame at the left side of the machine will have advanced the tack driver slides downwardly to bring the roll 310 (Fig. 5) and the corresponding roll at the left side of the machine into engagement with the wiper arms. Continued operation of the segments, after the pads and the presser members engage the upper, causes the rolls to swing the wiper arms towards each other, thereby advancing the wiper feet from their position indicated in Fig. 5 to their position in Fig. 6 to wipe those portions of the lasting margins of the upper and the lining at opposite sides of the breast line portion of the shoe inwardly over the margin of the insole. At the beginning of the wiping operation the slides 44 will have been moved rearwardly to a position in which the screw 182 in the right side 44 and the corresponding screw 322 in the left side 44 will have come into engagement with the rear end wall of the longitudinal slots 180 and 324. During the latter part of the wiping operation the sliding plates 178 and 316 are moved rearwardly causing the gripper jaws to open and causing the notches 208 and 248 in the sliding plates to come into registration with the pawls 206 and 244, whereupon the pawls swing inwardly into the notches to hold the sliding plates against forward movement and thus to hold the gripper jaws in their open position. Substantially concomitantly with the movement of the pawls into the notches the tack driving pins are released by the operation of a cam 326 (Fig. 3) at the upper end of the tack driver slide 50, and the torsion spring 328 and the corresponding spring at the left side of the machine operate to drive tacks through the overwiped margins of the upper and the lining and the margin of the insole, the tacks being clinched against a metal plate 330 (Fig. 6) at the heel end of the last bottom. Concomitantly with the tack driving operation the crank operated slide 36 (Fig. 3) comes to the limit of its rearward movement. After the tacks are driven the slide moves forwardly to return the power operated instrumentalities to their respective rest positions shown in Fig. 3. The operator then grips the toe portion of the shoe and draws it toward him into its position shown in Fig. 1 and lifts it off the last pin 94. In the operation of the machine as above described the grippers engage the lasting margins of the upper and the lining and tension them uniformly heightwise of the last. In the manufacture of certain types of shoes it may be desirable to apply tension to the lining only, in which case the lasting margin of the lining at opposite sides of the heel portion of the upper would be inserted between the gripper jaws and the lasting margin of the upper would lie against the outer surface of the gripper jaw 146 and would not be acted upon by the grippers. Conversely, the lasting margin of the upper only may be engaged by the gripper jaws so that the upper but not the lining is tensioned by the action of the grippers.

Having thus described my invention, what I claim as new and desire to secure by Letters Patent of the United States is:

1. In a machine for shaping uppers over lasts, a support for a last and an upper thereon, means mounting the support for movement in the direction of the length of a last thereon, a pair of gripper jaws constructed and arranged to engage the bottom margin of a side portion of an upper on the last, a detent for holding the jaws open, an actuator, means whereby the actuator releases the detent to permit the jaws to close, and means whereby the actuator advances the support after the gripper jaws have been closed thereby to cause the upper to be tensioned lengthwise of the last.

2. In a machine for shaping uppers over lasts, the combination with operating instrumentalities of means mounting a last with an upper thereon for endwise movement relatively to the operating instrumentalities, yielding means providing a first stop position for the endwise movement of the last, and positive means providing a second stop position for the endwise movement of the last.

3. In a machine for shaping uppers over lasts, the combination with operating instrumentalities of means mounting a last with an upper thereon for endwise movement relatively to the operating instrumentalities, means providing a first stop position for the endwise movement of the last, means providing a second stop position for the endwise movement of the last, and means for advancing the last from its first stop position to its second stop position.

4. In a machine for shaping uppers over lasts, the combination with operating instrumentalities of means mounting a last with an upper thereon for endwise movement relatively to the operating instrumentalities, means providing a first stop position for the endwise movement of the last, means providing a second stop position for the endwise movement of the last, a treadle, and means whereby the treadle advances the last from its first stop position to its second stop position.

5. In a machine for shaping uppers over lasts, the combination with operating instrumentalities of means mounting a last and an upper thereon for endwise movement relatively to the operating instrumentalities, a first abutment member providing a yielding stop position for the endwise movement of the last, and a second abutment member providing a positive stop position for the endwise movement of the last.

6. In a machine for shaping uppers over lasts, the combination with operating instrumentalities of means mounting a last and an upper thereon for endwise movement relatively to the operating instrumentalities, a first abutment member providing a first stop position for the endwise movement of the last, a second abutment member providing a second stop position of the endwise movement of the last, and means mounting the abutment members for bodily movement as a unit in the direction of the length of the last.

7. In a machine for shaping uppers over lasts, the combination with operating instrumentalities of means mounting a last and an upper thereon for endwise movement relatively to the operating instrumentalities, a first abutment member providing a first stop position for the endwise movement of the last, a second abutment member providing a second stop position of the endwise movement of the last, and means mounting the first abutment member for adjustive movement widthwise of the last.

8. In a machine for shaping uppers over lasts, the combination with operating instrumentalities of means mounting a last and an upper thereon for endwise movement relatively to the operating instrumentalities, a first abutment member providing a first stop position for the endwise movement of the last, a second abutment member providing a second stop position of the endwise movement of the last, and means mounting the abutment members for bodily movement as a unit in the direction of the length of the last and mounting the first abutment member for adjustive movement widthwise of the last.

9. In a machine for shaping uppers over lasts, the combination with operating instrumentalities of means mounting a last and an upper thereon for endwise movement relatively to the operating instrumentalities, a first abutment member providing a first stop position for the endwise movement of the last, a second abutment member providing a second stop position for the endwise movement of the last, a carrier mounted in the second abutment member and constructed and arranged for movement in the direction of the length of the last, and means for mounting the first abutment member on the carrier for adjustive movement widthwise of the last.

10. In a machine for shaping uppers over lasts, the combination with operating instrumentalities of means mounting a last and an upper thereon for endwise movement relatively to the operating instrumentalities, a first abutment member providing a first stop position for the endwise movement of the last, a second abutment member providing a second stop position for the endwise movement of the last, a carrier mounted in the second abutment member and constructed and arranged for movement in the direction of the length of the last, means for mounting the first abutment member on the carrier for adjustive movement widthwise of the last, and means for mounting the second abutment member for adjustive movement in the direction of the length of the last.

11. In a machine for shaping uppers over lasts, the combination with operating instrumentalities of means mounting a last with an upper thereon for endwise movement relatively to the operating instrumentalities, a gripper constructed and arranged to engage the lasting margin at one side of the upper, means providing a first stop position for the endwise movement of the last, means providing a second stop position for the endwise movement of the last, an actuator, means operable by an initial movement of the actuator for causing the gripper to grip the lasting margin, and means operable by continued movement of the actuator for causing endwise movement of the last relatively to the grippers from its first stop position to its second stop position.

12. In a machine for shaping uppers over lasts, the combination with operating instrumentalities of means mounting a last with an upper thereon for endwise movement relatively to the operating instrumentalities, a gripper constructed and arranged to engage the lasting margin at one side of the upper, means providing a first stop position for the endwise movement of the last, means providing a second stop position for the endwise movement of the last, an actuator, means operative by an initial movement of the actuator for causing the gripper to grip the lasting margin, means operable by continued movement of the actuator for causing endwise movement of the last from its first stop position to its second stop position, power operated mechanism for inserting fastening means to secure the lasting margin of the upper to an insole on the last bottom, and means operated by the actuator as the last approaches its second stop position for causing the operation of the power operated mechanism.

13. In a machine for shaping uppers over lasts, the combination with operating instrumentalities of means mounting a last and an upper thereon for endwise movement relatively to the operating instrumentalities, a first abutment member providing a first stop position for the endwise movement of the last, a second abutment member providing a second stop position for the endwise movement of the last, and a third abutment member carried by the second abutment member and constructed and arranged to engage an insole on the last bottom thereby to position the last heightwise thereof relatively to the operating instrumentalities.

14. In a machine for shaping uppers over lasts, the combination with operating instrumentalities, of means mounting a last with an upper thereon for endwise movement relatively to the operating instrumentalities, means providing a first stop position for the endwise movement of the last, means providing a second stop position for the endwise movement of the last, a gripper constructed and arranged to engage the lasting margin at one side of the upper, and means mounting the gripper for movement lengthwise of the last with a component heightwise of the last in response to the movement of the last from its first stop position to its second stop position.

15. In a machine for shaping uppers over lasts, the combination with operating instrumentalities, of means mounting a last with an upper thereon for endwise movement relatively to the operating instrumentalities, means providing a first stop position for the endwise movement of the last, means providing a second stop position for the endwise movement of the last, a gripper constructed and arranged to engage the lasting margin at one side of the upper, means mounting the gripper for movement lengthwise of the last with a component heightwise of the last response to the movement of the last from its first stop position to its second stop position, a spring for causing the gripper to grip the lasting margin, a detent for preventing the operation of the spring, and means for releasing the detent.

16. In a machine for shaping uppers over lasts, the combination with operating instrumentalities, of means mounting a last with an upper thereon for endwise movement relatively to the operating instrumentalities, means providing a first stop position for the endwise movement of the last, means providing a second stop position for the endwise movement of the last, a gripper constructed and arranged to engage the lasting margin at one side of the upper, means mounting the gripper for movement lengthwise of the last with a component heightwise of the last in response to the movement of the last from its first stop position to its second stop position, a spring for causing the gripper to grip the lasting margin, a detent for preventing the operation of the spring, an actuator, means operated by an initial movement of the actuator for releasing the detent, and means operated by continued movement of the actuator after the detent has been released for moving the last from its first stop position to its second stop position.

17. In a shoe machine, an actuator, a member carried by the actuator, a jack post mounted for swinging movement, and means operatively connecting the member to the jack post including a pawl and a ratchet which are brought into operative relation to each other by an initial movement of the jack post.

18. In a shoe machine, a treadle, an arm carried by the treadle, a shoe supporting member, and means operatively connecting the arm to the shoe supporting member comprising mutually engaging members which are brought into operative relation to each other by an initial movement of the shoe supporting member.

19. In a shoe machine, a treadle, an arm carried by the treadle, a shoe supporting member, and means operatively connecting the arm to the member comprising a pawl carried by the arm, and a ratchet constructed and arranged to be advanced into operative relation to the pawl by an initial movement of the member.

20. In a machine for shaping uppers over lasts, a pair of gripper jaws constructed and arranged to engage the lasting margin at one side of an upper mounted on a last, a spring for closing the gripper jaws, a detent for holding the jaws open, an actuator, means including breakable connections whereby the movement of the actuator releases the detent, means for causing the breakable connections to be broken by continued movement of the actuator, and means for causing the last and the upper thereon to be moved relatively to the gripper jaws by a still further movement of the actuator.

21. In a machine for shaping uppers over lasts, a pair of gripper jaws constructed and arranged to engage the lasting margin at one side of an upper mounted on a last, a spring for closing the gripper jaws, a detent for holding the jaws open, an actuator, means including breakable connections whereby the movement of the actuator releases the detent, means for causing the breakable connections to be broken by continued movement of actuator, means for causing the last and the upper thereon to be moved relatively to the gripper jaws by a still further movement of the actuator, power means for wiping inwardly over an insole on the last bottom that portion of the lasting margin of the upper operated on by the gripper jaws, power operated means for inserting a fastening to secure the overwiped margin to the insole, a power driven shaft, and means operated by still further movement of the actuator for connecting the wiping means and the fastening inserting means to the power driven shaft.

22. In a machine for shaping uppers over lasts, a wiper for wiping a portion of the lasting margin of an upper inwardly over an insole on a last bottom, a driver for driving a tack to secure the overlasted marginal portion of the upper to the insole, a slide in which the driver is mounted, a frame in which the slide is mounted, a wiper arm mounted on the frame for operative movement, and means actuated by the slide for operating the arm.

References Cited in the file of this patent

UNITED STATES PATENTS

| | | |
|---|---|---|
| 693,620 | Preston | Feb. 18, 1902 |
| 1,006,821 | Bates | Oct. 24, 1911 |
| 1,117,440 | Prenzel | Nov. 17, 1914 |
| 1,132,978 | Russell | Mar. 23, 1915 |
| 1,167,913 | Mayo | Jan. 11, 1916 |
| 1,176,022 | Bates | Mar. 21, 1916 |
| 1,514,606 | Elliott | Nov. 11, 1924 |
| 1,648,403 | Jorgensen | Nov. 8, 1927 |
| 1,706,620 | Lawson | Mar. 26, 1929 |
| 1,813,983 | Bates | July 14, 1931 |
| 1,963,170 | Lawson | June 19, 1934 |
| 2,078,330 | Lawson | Apr. 27, 1937 |
| 2,268,597 | Jorgensen | Jan. 6, 1942 |
| 2,339,504 | Miller | Jan. 18, 1944 |